(12) United States Patent
Susskind (10) Patent No.: US 7,197,447 B2
(45) Date of Patent: Mar. 27, 2007

(54) METHODS AND SYSTEMS FOR ANALYZING SOFTWARE RELIABILITY AND AVAILABILITY

(75) Inventor: Silvio Susskind, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 468 days.

(21) Appl. No.: 10/438,130

(22) Filed: May 14, 2003

(65) Prior Publication Data

US 2004/0230858 A1 Nov. 18, 2004

(51) Int. Cl.
G06F 9/455 (2006.01)

(52) U.S. Cl. .................. 703/22; 714/38; 713/158; 717/107; 717/124; 717/126

(58) Field of Classification Search .............. 703/2, 703/14, 22; 717/107, 124, 126; 704/235; 714/1, 38; 713/155
See application file for complete search history.

(56) References Cited

U.S. PATENT DOCUMENTS

| | | | |
|---|---|---|---|
| 5,548,718 | A | 8/1996 | Siegel et al. |
| 5,938,729 | A | 8/1999 | Cote et al. |
| 6,119,125 | A * | 9/2000 | Gloudeman et al. .... 707/103 R |
| 6,178,529 | B1 | 1/2001 | Short et al. |
| 6,233,570 | B1 | 5/2001 | Horvitz et al. |
| 6,260,035 | B1 | 7/2001 | Horvitz et al. |
| 6,557,120 | B1 | 4/2003 | Nicholson et al. |
| 6,671,874 | B1 * | 12/2003 | Passova ...................... 717/126 |
| 6,745,382 | B1 * | 6/2004 | Zothner ...................... 717/107 |
| 7,024,580 | B2 * | 4/2006 | Guimbellot et al. ........... 714/1 |
| 2002/0059423 | A1 | 5/2002 | Leymann et al. |
| 2003/0023435 | A1 * | 1/2003 | Josephson ................... 704/235 |
| 2003/0055948 | A1 | 3/2003 | Wang |
| 2004/0230872 | A1 * | 11/2004 | Mullally et al. ............... 714/38 |
| 2004/0230953 | A1 * | 11/2004 | Garzia et al. ................ 717/124 |
| 2005/0114653 | A1 * | 5/2005 | Sudia .......................... 713/158 |

OTHER PUBLICATIONS

IBM, *A new paradigm for performance and availability*, IBM Corporation, pp. 1-9 (2002).
Hewlett Packard, *Take coNTrol of your networked Windows NT environment*, Hewlett Packard Company pp. 1-17 (Oct. 1, 1999).
Pramanick, IRA, *Modeling Sun™ Cluster Availability*, Sun Microsystems, Inc. pp. 1-19 (2002).
TNT Software, *TNT Software ELM Enterprise Manager™ Administrator's Guide*, TNT Software, pp. 1-109 (1997-2003).
Woodstone Consulting & Development, *Servers Alive Administrator's Guide*, Woodstone bvba, pp. 1-237 (1997-2003).

* cited by examiner

*Primary Examiner*—Thai Phan
(74) *Attorney, Agent, or Firm*—Marshall, Gerstein & Borun LLP (57) ABSTRACT

Disclosed is a software application reliability and availability tracking and reporting mechanism that collects event data from target computers, analyzes the data, and produces reliability and availability reports. A network administrator specifies target computers for which event data are collected. The collected event data along with a reliability model are provided to a reliability and availability analysis engine. Output from the engine includes reliability and availability data expressed as durations of time spent in each state and as associations with the events. The reliability and availability data are fed to a report generator which computes reliability and availability metrics. The metrics are used to generate reports that can be interpreted by the network administrator without the need for specialized data analysis skills. The metrics are also aggregated to provide historical and relative ranking reliability and availability data useful for planning and tracking against reliability and availability objectives.

12 Claims, 7 Drawing Sheets

METHODS AND SYSTEMS FOR ANALYZING SOFTWARE RELIABILITY AND AVAILABILITY

RELATED APPLICATIONS

This application contains information related to U.S. patent application Ser. No. 10/437,657 for "Methods And Systems For Collecting, Analyzing, and Reporting Software Reliability And Availability," Joseph P. Mullally et al., inventors, filed on May 14, 2003, and to U.S. patent application Ser. No. 10/438,129 for "Methods And Systems For Planning And Tracking Software Reliability And Availability," Mario R. Garzia et al., inventors, filed on May 14, 2003.

TECHNICAL FIELD

The present invention relates generally to software application reliability and availability tracking and, more particularly, to analyzing, reporting, and planning software application reliability and availability.

BACKGROUND OF THE INVENTION

Providing customers with a high level of service availability at a low cost is imperative in today's business computing environment. Meeting this goal requires corporations to establish the right availability objectives to meet their business needs, to track the level of availability attained by their application servers, and to take quick corrective action when falling below those objectives. Establishing and achieving the right level of availability is critical. If the service availability is low, there will be a very definite cost in terms of lost revenue as well as in opportunity and customer goodwill costs. If the business is providing a higher level of availability than that required, say striving for 99.99% availability on a 24×7 basis, when the business really only requires 8×5, then the business is incurring a higher cost than necessary in terms of hardware, software, and operations overhead to meet the additional—and unneeded—level of availability. In a very competitive business world it is critical for companies to be able to determine and achieve the right level of availability to meet their business needs, no more and certainly no less.

Yet today many businesses do not have service reliability and availability objectives set in accordance with their business needs, and furthermore they do not have accurate measurements to characterize either their long term (i.e., non-real time) availability or their areas for improvement. Even when objectives are set and reliability data are collected, accurately analyzing and interpreting the results are difficult due to the need for specialized expertise which is often not available. The lack of specialized expertise can lead to improper interpretation of the data, and thus an incorrect estimation of the achieved service availability. If the level of service availability being delivered is incorrectly overestimated, the company's customers can become dissatisfied. If the level of availability is underestimated, the requested improvements, to achieve the desired objective, are unnecessary.

Today, many companies depend on their ticketing systems to determine server availability by looking at the time the system went down and the time the problem was resolved and the system brought back into operation. While ticketing systems can be a rich source of individual failure troubleshooting data, the timing values recorded by the operations staff are often inaccurate, especially when considering the level of accuracy required for these types of measurements (e.g., 99.999% availability is only 5 minutes of downtime a year). The degree of inaccuracy varies from event to event and occurs for many reasons, including unwillingness to document all of the work if the right troubleshooting steps were not taken, and the business of the staff was during the time of the failure, sometimes not closing the ticket for hours or even days after resolution.

For web-facing services, many companies depend on outside tools or services that provide availability monitoring through the network or Internet. These tools and services, which ping a particular application and measure its ability to respond within a specified amount of time, can provide a good measurement of availability from a user's perspective. However they do not provide an accurate measure of availability if their polling rate (i.e., the frequency with which they ping the web servers) is insufficient to measure the desired level of accuracy (e.g., pinging a server every 15 minutes is certainly insufficient for measuring 99.999% availability).

Even in cases where the polling frequency is appropriate, these measurement tools do not provide insight into what portion of the system is at fault when there is a failure or even the frequency of server shutdowns (i.e., the reliability of the servers) making it difficult to troubleshoot problems and improve results. In addition, the tools do not provide insight into the cost of maintaining a given level of availability, that is, into the amount of work required by the operations staff to meet the objectives. For example, when pinging a web-server farm, the tools do not usually know which server is responding behind the load balancing technology in use. The responding server may or may not change between service pings making it very hard to determine individual server behavior.

SUMMARY OF THE INVENTION

In view of the foregoing, the present invention provides a method for analyzing software application reliability and availability by accepting collected event data and a reliability model, processing the data against the reliability model, and producing reliability and availability data in the form of state sojourns.

The collected event data are provided to a reliability and availability analysis engine. The reliability and availability analysis engine also takes as input a reliability model. In some embodiments, the reliability model is a finite-state diagram with the states that are to be tracked for reliability and availability and the corresponding events which signal transitions between the states. Also included in the reliability model can be transition associations which are events that occur in some proximity to the state transitions and hence might be potential causes for the transition between the states.

The reliability and availability analysis engine processes the event data, mapping it to the reliability model. Output from the engine includes the reliability and availability data expressed as state sojourns, which are defined by the time an application entered a state and the time the application left the state. Additionally, the event data are mapped to the transition associations of the reliability model. This mapping can produce associations to the state sojourns as part of the reliability and availability data.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein. Sections I through III below describe the basics of the reliability and availability analysis and reporting mechanisms. Section IV presents implementation options useful in particular situations. Section V shows how the reliability and availability analysis and reporting mechanisms operate in situations beyond those discussed in Sections I through III.

I. Exemplary Environment

Figure 1:
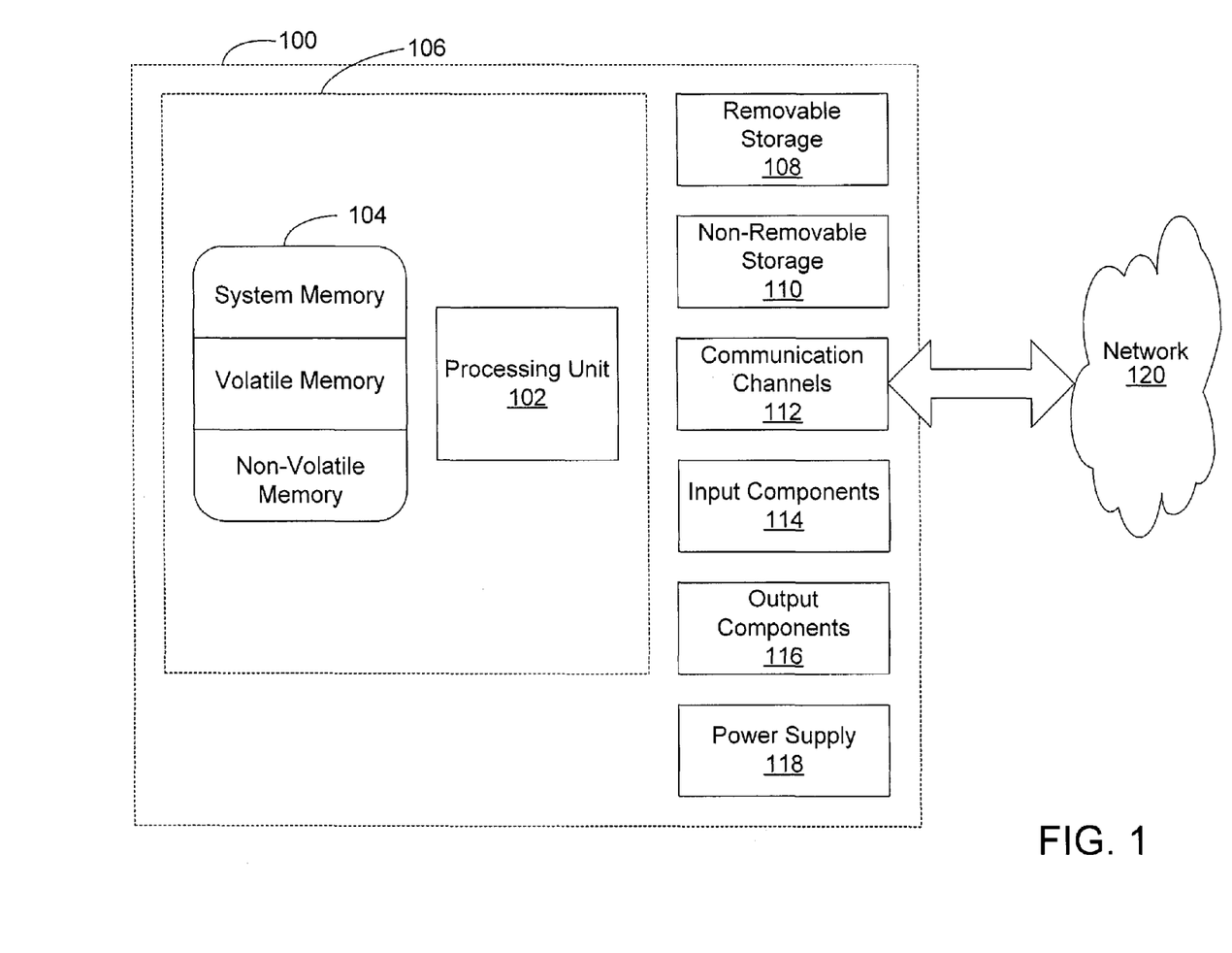
FIG. 1 is a schematic diagram of an exemplary computer architecture on which the mechanisms of the invention may be implemented.

Referring to FIG. 1, the present invention relates to tracking of software application reliability and availability. The software application resides on a computer that may have one of many different computer architectures. For descriptive purposes, FIG. 1 shows a schematic diagram of an exemplary computer architecture usable for these devices. The architecture portrayed is only one example of a suitable environment and is not intended to suggest any limitation as to the scope of use or functionality of the invention. Neither should the computing devices be interpreted as having any dependency or requirement relating to any one or combination of components illustrated in FIG. 1. The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing device 100 typically includes at least one processing unit 102 and memory 104. The memory 104 may be volatile (such as RAM), non-volatile (such as ROM and flash memory), or some combination of the two. This most basic configuration is illustrated in FIG. 1 by the dashed line 106.

Computing device 100 can also contain storage media devices 108 and 110 that may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing device.

Computing device 100 can also contain communication channels 112 that allow it to communicate with other devices. Communication channels 112 are examples of communications media. Communications media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, radio, infrared, and other wireless media. The term computer-readable media as used herein includes both storage media and communications media. The computing device 100 may also have input components 114 such as a keyboard, mouse, pen, a voice-input component, and a touch-input device. Output components 116 include screen displays, speakers, printers, and rendering modules (often called "adapters") for driving them. The computing device 100 has a power supply 118. All these components are well known in the art and need not be discussed at length here.

II. The Need for Reliability and Availability Tracking

The present invention is directed to a system that collects and analyzes reliability and availability data from a targeted set of computers. This reliability and availability tracking mechanism can be applied to provide help to a network administrator in identifying problem servers, to give reliability and availability comparison reports, and to provide other reporting to assist the network administrator in managing his servers to a high level of availability and reliability.

Figure 2:
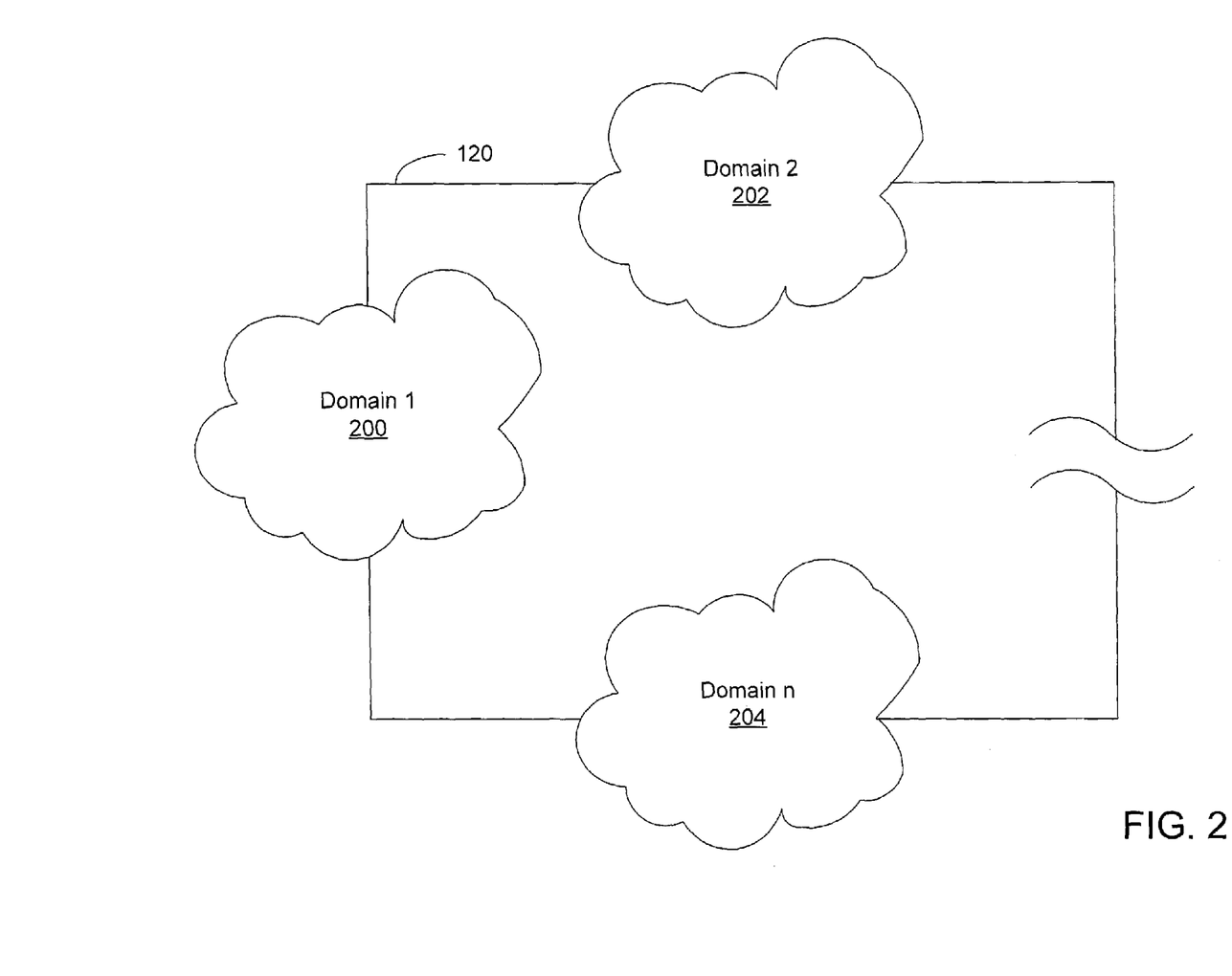
FIG. 2 is a block diagram of an exemplary installation location in which the reliability and availability tracking and reporting mechanisms of the invention can be practiced.
Figure 3:
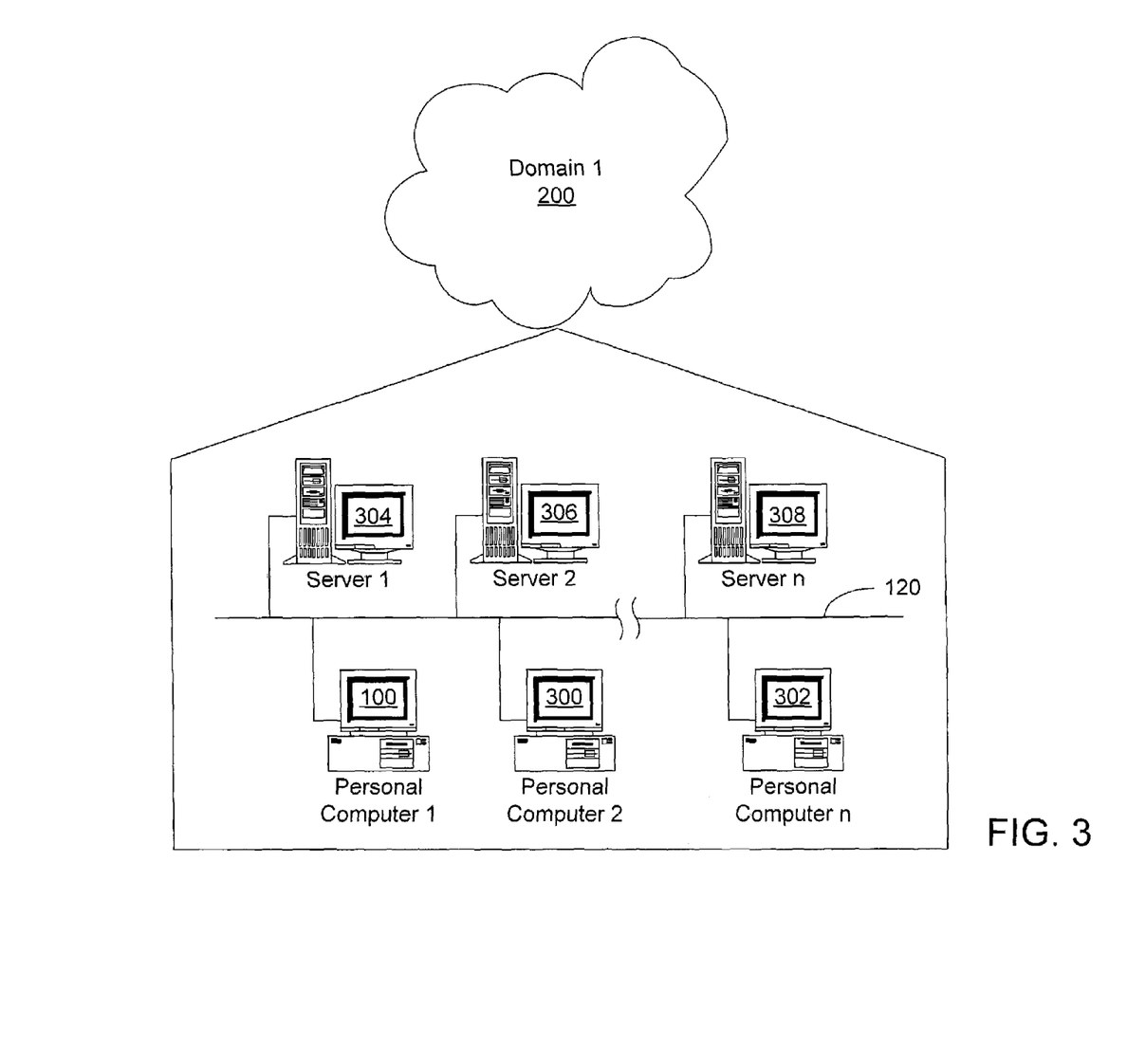
FIG. 3 is a block diagram of an exemplary communications network in which the reliability and availability tracking and reporting mechanisms of the invention can be practiced.

To facilitate an understanding of the need for a mechanism which provides the ability to accurately measure reliability and availability and of a means to improve reliability and availability such as provided by the invention consider the exemplary network of FIGS. 2 and 3. In FIG. 2, a typical enterprise-wide installation is composed of a number of installation locations 120. Each of these locations 120 is made up of a number of network domains 200, 202, and 204. Typically these domains 200, 202, and 204 are interconnected via a local area network (LAN) or perhaps a leased-line connection or some similar wide area connection (WAN). In one such scenario, an enterprise computing environment has established a North American location and a European location. Within the North American location are network domains for New York, Chicago, and Los Angeles. Within the European location are network domains for London, Paris, and Frankfurt.

Turning to FIG. 3, within each network domain 200 resides a LAN 120. Accompanying a computing device 100 on the LAN 120 is a server 304. The server 304 is typically where the bulk of mission-critical applications reside. For example, a particular domain has a server 304 equipped with software handling inbound and outbound e-mail communications. Another server 306 has database software installed and maintains various databases accessed from desktop applications. Yet another server 308 functions as a file server from which the computing device 100 accesses files.

As is appreciated by one of ordinary skill in the art, particular problems with maintaining software applications in a reliable and available state can go undiagnosed or even misdiagnosed for long periods of time. For example, an e-mail server 304 may require unscheduled periodic reboots. These reboots may or may not occur during peak business hours. If they do not occur during peak business hours they may go on undetected by anyone other than the server administrator for an undeterminable period of time. If, on the other hand, the reboots occur during regular business hours they are certain to be noticed from the resulting service outage. Due to the mission-critical nature of e-mail, determining the cause of the outage will be assigned a high priority. This may be problematic in its own right however, in that all that can be distilled from the periodic reboots is that the application is failing to maintain the necessary operational state. Little else is known as to the cause of the crashes, and it may require an exhaustive approach of addressing various software, hardware, and networking issues before the problem can be fixed, if it even is fixed at all. Yet one more scenario involves an e-mail server located in a network domain where peak business hours are significantly staggered from those of the server's network administrator. In this case, like the one before it, an outage is certain to be noticed. However the network administrator would not be able to conveniently track the server's availability and reliability due to the difference in time zones.

To track software applications for crashes of the sort described in the examples of the previous paragraph, a network administrator needs an accurate and consistent picture of reliability and availability for servers running the applications within the domain 200. When the network administrator is able to identify problem servers and receive reliability and availability comparison reports and other reporting, he will be greatly assisted in the management of his servers to a high level of availability and reliability. Section III below details how the present invention enables both the reliability and availability tracking and reporting methods described above.

III. Reliability and Availability Tracking and Reporting

The invention provides a network administrator with a complete picture of server application reliability and availability. The reliability and availability tracking and reporting mechanism can track a number of application states beyond simply "up" and "down" states. A reliability and availability analysis engine processes event data and produces reliability and availability data for any number of application states.

Embodiments of the invention apply software application event data to reliability models. A reliability model contains a finite-state model and related transition associations. The finite-state model tracks an application through a series of states giving a detailed analysis of application reliability and availability. The transition associations provide an opportunity to hone in on related events that occur in temporal proximity to the state transitions. One way these reliability and availability data are produced is described in connection with FIGS. 4, 5, and 6.

Figure 4:
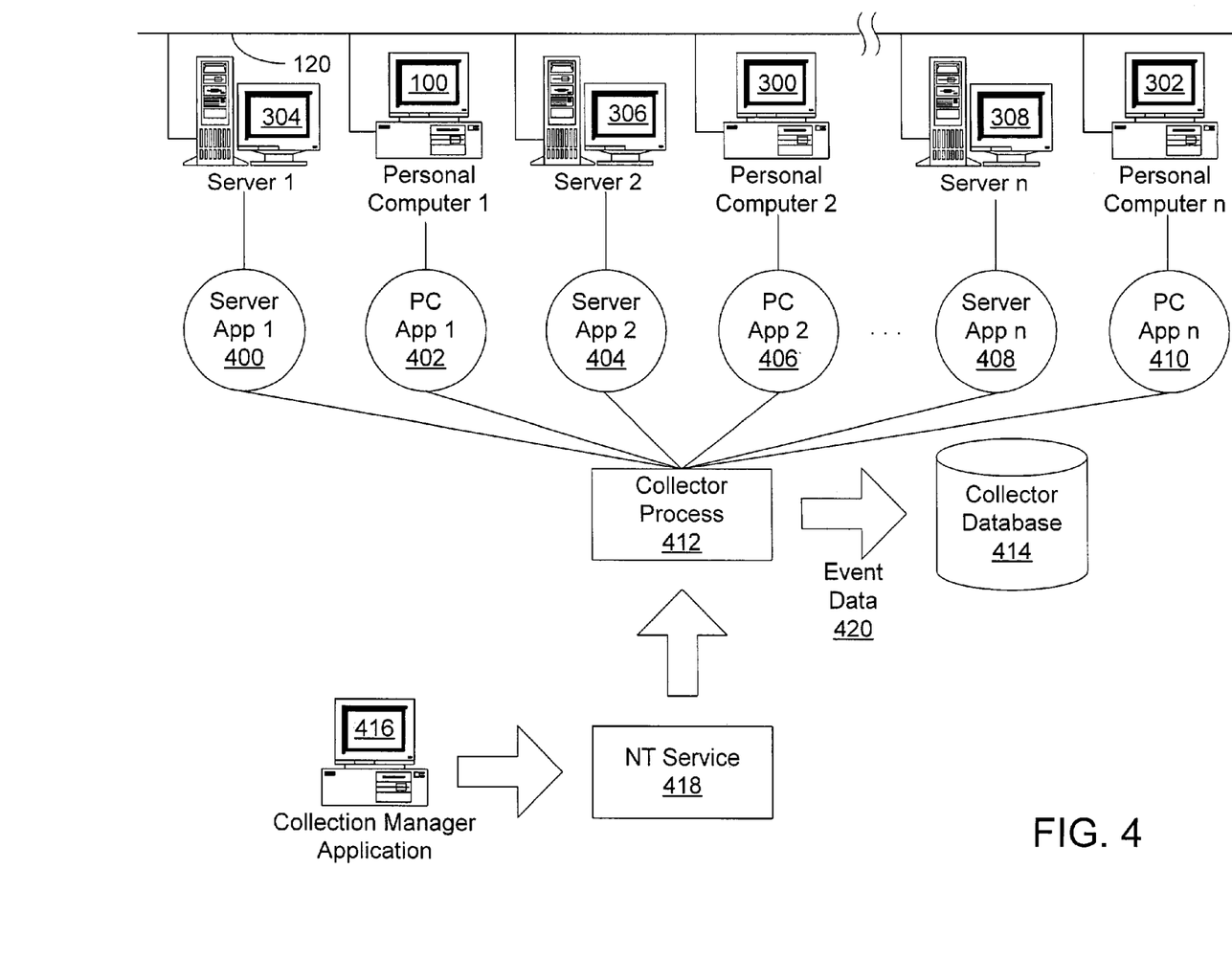
FIG. 4 is a process flow diagram showing how event data are collected.

In FIG. 4, a typical network installation contains a number of personal computers 100, 300, and 302 and server computing devices 304, 306, and 308. Each of the servers 304, 306, and 308 runs a software application 400, 404, and 408. In addition, each personal computer 100, 300, and 302 can also run a software application 402, 406, and 410 that can be tracked for reliability and availability. In order to determine the reliability and availability of an application, certain data regarding that software application are collected. These data are application log data (i.e., event data that an application writes to a file), as they are commonly referred to by those of ordinary skill in the art.

The event data collection process begins with the collection manager application 416. From this application the network administrator chooses which personal computers 100, 300, and 302 and servers 304, 306, and 308 he would like to track for reliability and availability. He may select personal computers 100, 300, and 302 and servers 304, 306, and 308 within any of the network domains or installation locations, such that if a particular application has instantiations in more than one server for example, all servers running that application are tracked. Thus, the tracking covers a reliability and availability picture for a logical server in addition to the physical servers. The network administrator can select particular dates and ranges of times during which the reliability and availability will be tracked.

The tracking parameters that the network administrator selects are received by an NT service 418. An NT service is an application that runs in the background and can be executed at scheduled times or at times initiated by the Windows NT operating system. Periodically the NT service 418 executes the collector process 412. The collector process 412 in turn executes remote procedure calls (RPCs) to the personal computers 100, 300, and 302 and servers 304, 306, and 308 to access their application log data for the selected software applications. These event data 420, once collected, are persisted in the collector database 414 or in some other similar storage means. Once stored in the collector database 414, the event data 420 can be normalized and checked for integrity and consistency.

Figure 5:
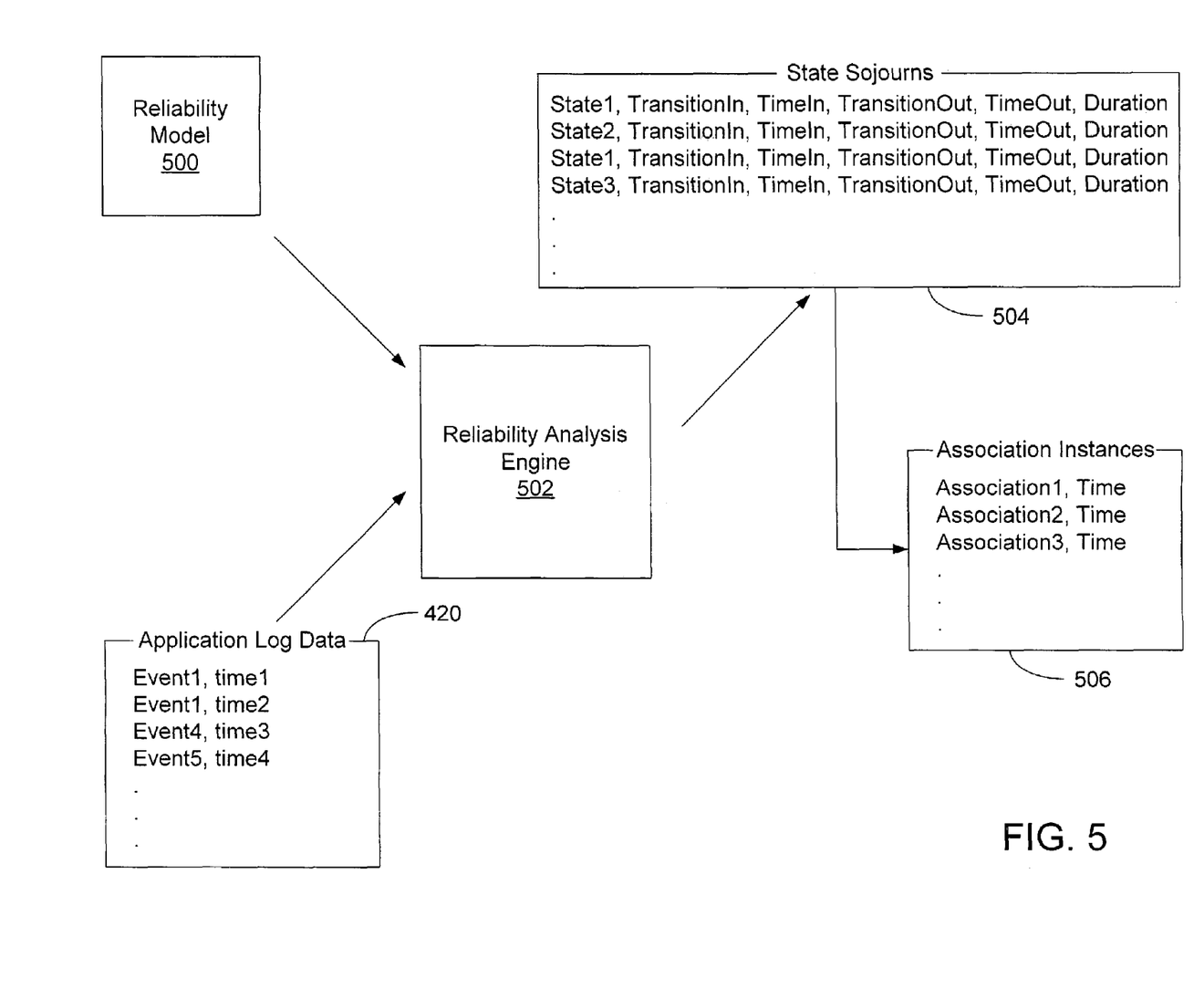
FIG. 5 is a data flow diagram of the reliability and availability engine and its inputs and outputs.

Turning to FIG. 5, the reliability and availability analysis engine 502 accesses the collected event data 420. Taking as input the event data 420 and a reliability model 500, which can be stored within the collector database 414, the engine 502 produces reliability and availability data in the form of state sojourns 504, which are defined by the times applications enter and exit states. Some of the state sojourns 504 are related to association instances 506. These instances 506 are events that occur within a specified temporal proximity of the transitions between the state sojourns 504. They may be of interest in determining root causes of failure.

Figure 6:
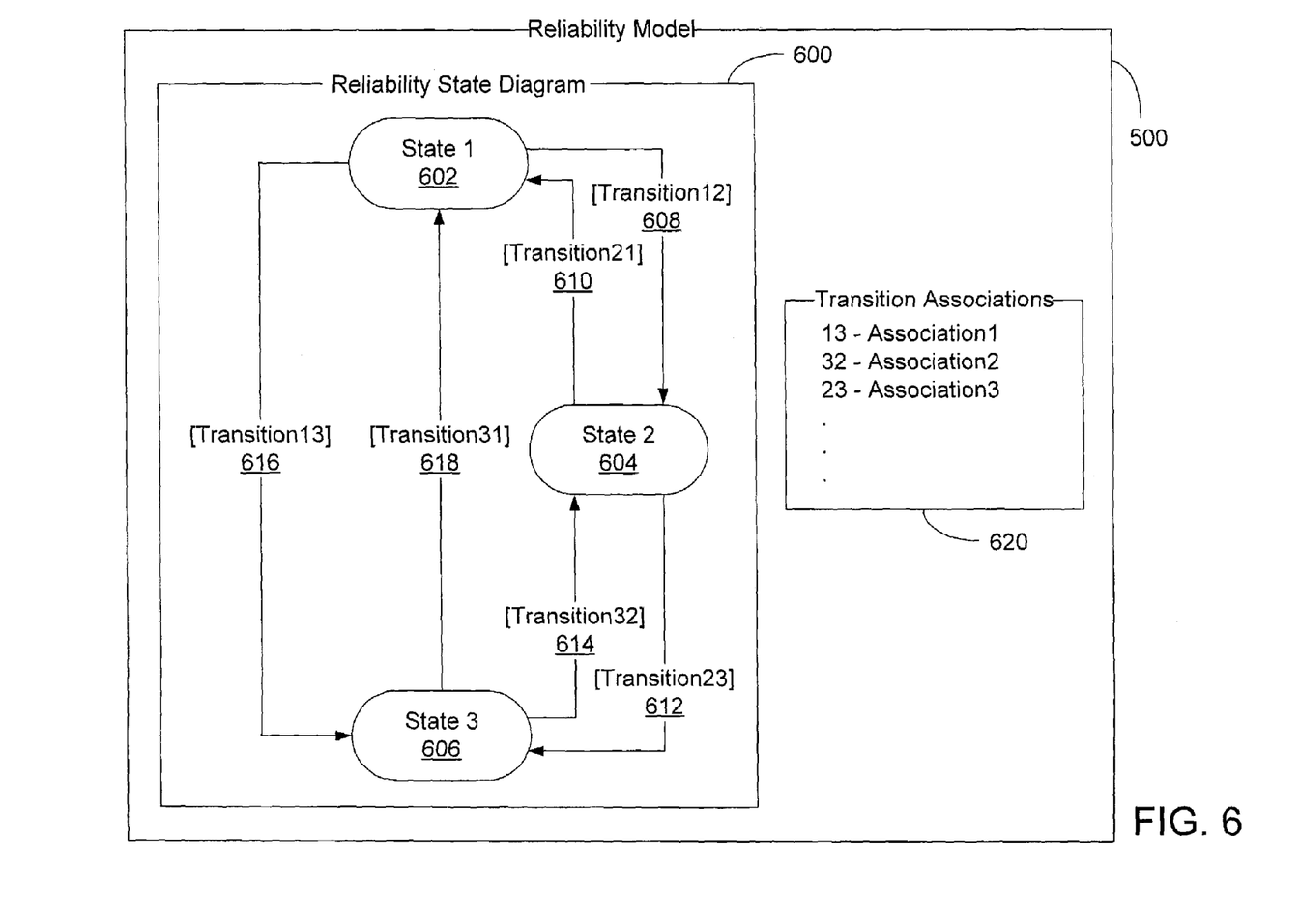
FIG. 6 is a schematic diagram of the components of the reliability model used by the reliability and availability analysis engine.

With reference to FIG. 6, the reliability model 500 contains a reliability state diagram 600 and transition associations 620. In some embodiments, the reliability state diagram 600 is a finite-state model here represented by states 602, 604, and 606 and by transitions between those states 608, 610, 612, 614, 616, and 618. Modeling application reliability as a finite-state model 600 allows for any number of states to be tracked. For example an application can have the following states: up 602, down 606, and unavailable 604. So long as event data 420 from the application data logs (e.g., startup, shutdown) can be mapped to the transitions between states, a picture of reliability for the state diagram 600 can be derived. Furthermore if certain event data 420 can be determined to be associated with the transitions between the states, then that data can be modeled as transition associations 620, thereby making the reliability and availability picture that much more complete.

This reliability and availability picture includes the state sojourns 504 and the association instances 506. By mapping the event log data 420 to the reliability and availability model 500, the engine 502 expresses the reliability and availability of an application as a series of state sojourns 504. These state sojourns 504 detail the various states that the application was in during the period tracked and also specify the time that state was entered, the time it was exited, and in some instances the event that signaled the transition into that state and the event that signaled the transition out of that state. These data show how long an application was in an up state, an unavailable state, a down state, what events precipitated the move from state to state, and in what particular order these states occurred. In addition, the data can be used to calculate all standard long-term availability and reliability statistics. These include measures of central tendency (e.g., mean, median) and dispersion (e.g., standard deviation and percentiles) which are commonly used to describe such statistics. Furthermore, some state sojourns 504 have related association instances as defined by the reliability model 600. These association instances are of particular interest in determining the relevancy of certain events that occurred in proximity to the entering of the state. The association instances provide a network administrator tasked with determining the cause or causes for less than desired levels of reliability and availability with a plausible starting point from which to investigate. This information can alleviate the need for an exhaustive approach of addressing various software, hardware, and networking issues before the reliability and availability issues are resolved.

Figure 7:
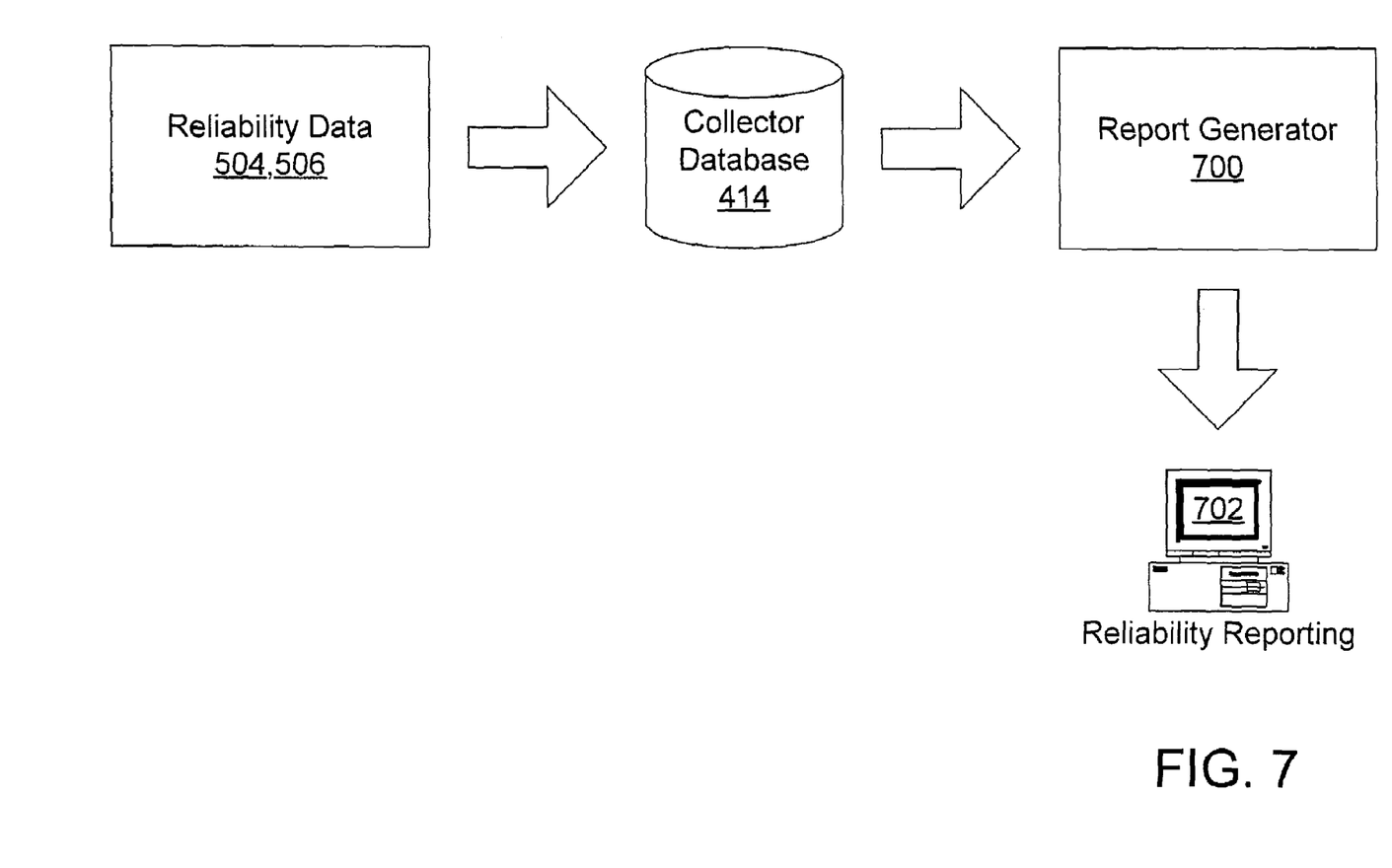
FIG. 7 is a data flow diagram showing the report generator and its inputs and outputs.

In FIG. 7 the reliability and availability data 504 and 506 output from the reliability and availability analysis engine 502 are persisted in the collector database 414 or in some other similar storage means. From there the report generator 700 accesses the reliability and availability data 504 and 506. The report generator 700 then computes reliability and availability metrics. The following are some of the metrics computed: mean time to reboot (MTTReboot)=$\Sigma$ uptime/# reboots; mean time to restore (MTTRestore)=$\Sigma$ downtime/# reboots; mean time to failure (MTTFailure)=$\Sigma$ uptime/# failures; and mean time to bluescreen (i.e., OS crash) (MTTBS)=$\Sigma$ uptime/# crashes.

Of the above named metrics, two that are of particular interest are MTTReboot and MTTRestore. MTTReboot is the average application uptime duration, while MTTRestore is the average application downtime duration. The reliability of an application is defined to be the probability the application is operational for a given interval of time. Assuming a constant failure rate, this is measured using MTTReboot. In a two-level system, availability of an application is defined as the probability the application is operational at any point in time, i.e., the application is up. This can be measured using MTTReboot and MTTRestore in the following formula: availability=MTTReboot/(MTTReboot+MTTRestore).

Once the report generator 700 computes the reliability and availability metrics, reliability and availability reports are produced and accessed by the reliability and availability reporting interface 702. The reliability and availability reporting interface 702 allows network administrators to select particular parameters, such as dates, times, servers, or locations for which to obtain reliability and availability information. In addition, the network administrator can also filter out specific types of events from the analysis and reporting to take into account special datacenter or server situations. These situations include: maintenance periods of the week, long outages, servers with short runtimes, and initial server runtime events. Additionally the reliability and availability reporting interface 702 can also allow for reports that are accessed and displayed to be saved for viewing at some later time.

IV. Further Embodiments of Reliability and Availability Tracking and Reporting The invention as described above can be implemented as a single, integrated, non-distributed system. In such an implementation the whole invention resides on a single computing device and tracks availability and reliability on that computing device.

In other scenarios, the amount of data collected can be quite large and the network topology can span a large installation base making it advantageous to implement the reliability and availability tracking and reporting mechanisms of the present invention as a distributed system. In this scenario the reliability and availability tracking and reporting system could be implemented as a client and server system. The client system contains the collection manager application, the NT service, the collector process, and the collector database. The server system contains a transfer application (which accepts incoming data from the client system), the reliability and availability analysis engine, a server database (for storing availability and reliability data), the report generator, and the reliability and availability reporting interface application.

Implementing the present invention as a distributed system allows for maximum scalability and availability. Scalability of the client system is achieved by a large number of collectors across many sites. The server system is partitioned for scalability and servers can be redundant for high availability. Additional database availability is achieved through hardware means such as robust RAID disk subsystems.

In another embodiment, the server portion of the distributed system resides with a third-party host. In addition to the scalability and availability advantages described above, this scenario provides improved distribution of reliability and availability reporting via the Internet. A further benefit of this scenario is the facilitation of the collection of reliability and availability data across multiple organizations. This provides the ability to produce relative rank reporting (see Section V below). If the complete system resides exclusively within one location, a similar result is achievable by a third-party accepting only the reliability and availability data generated by the system at this location or at another site.

V. Applications of Reliability and Availability Tracking and Reporting

The present invention is applicable to several other applications. The reliability and availability tracking mechanism provides a network administrator with application reliability and availability data. Potential applications for the reliability and availability data include providing information about application reliability and availability over a defined time period, comparing the organizational reliability and availability with industry data, comparing the reliability and availability with objective goals, and providing feedback on how to improve reliability and availability by improving negative contributors of reliability and availability.

Application reliability and availability over a defined time period is useful to show trends in reliability and availability. The reliability and availability data produced by the present invention can be aggregated over periods of days, weeks, months, and years to provide reliability and availability trending reports. Such reports graph the application's rolling reliability and availability over a defined time period.

As detailed in Section IV above, it is possible to collect reliability and availability data in a central repository hosted by a third party. Collecting data over a wide range and number of organizations allows for a relative ranking of reliability and availability data to others in the industry.

The historical and relative ranking reports described above along with other reliability and availability reports detailed in Section III can be used in helping network administrators set reliability and availability goals for their systems. In this particular application, the network administrator enters reliability and availability objectives based on his system's historical performance. These goals are saved for later use in tracking against them. In the relative ranking scenario, the network administrator selects a set of servers with the goal of reaching the nth percentile in industry-wide reliability. These goals are also saved for later use in tracking against them.

Finally, the reliability and availability data can be used to track against the goals providing feedback on how to improve reliability and availability by improving negative contributors of reliability and availability. Once goals have been set, reports can be generated at any time during or after the period of time set for achieving the objectives. The reports give the network administrator metrics on how the application servers are performing relative to the goals set.

If the time period for achieving an objective ends in the future, the report identifies whether the system is on track to reach the set goals, whether the current run rate will cause it to exceed the goals, and whether it has already exceeded the goals. If the time period for the goals is completed, the report identifies whether the system reached or exceeded the goals that were set.

Additionally, the reports identify outliers in up time and down time (these outliers indicate frequent reboots or long outages) that caused the system to miss the set goal. If the objective was met the reports identify how to further improve on the objective. For each of these outliers the network administrator can either keep the outlier as a valid sample sojourn or throw out the outlier as a non-valid sample sojourn. The system's overall availability and reliability metrics may then be recalculated replacing the valid individual outliers for up-time and down-time with the mean up-time and down-time of the system. The network administrator is given these recalculated availability and reliability metrics with an explanation that if he is able to fix these worst offenders, (outlier sojourns) the overall availability and reliability can be improved to this new number.

Reliability and availability data also undergo analysis prior to reporting to highlight results that may not be accurate due to insufficient data (e.g., an availability result over a very short time period). The results of this analysis are used to highlight in the report results that may not be accurate. This feature provides guidance to the network administrator on how to interpret the accuracy of the results without the need for specialized data analysis expertise.

In view of the many possible embodiments to which the principles of this invention may be applied, it should be recognized that the embodiments described herein with respect to the drawing figures are meant to be illustrative only and should not be taken as limiting the scope of invention. For example, for performance reasons reliability and availability tracking may be implemented in hardware, rather than in software. Therefore, the invention as described herein contemplates all such embodiments as may come within the scope of the following claims and equivalents thereof.

What is claimed is:

1. A method for producing software reliability and availability data, the method comprising:
   accepting a reliability model, the reliability model receiving at least a first state and a second state and a plurality of transitions between the states;
   accepting a collection manager, the collection manager allowing:
      a selection of one or more computers from which to collect software application event data;
      a selection of a group of computers which may be in separate locations on separate networks to create a virtual group of computers from which to collect software application event data; and
      a selection of dates and times for the collection manager to operate;
   accepting the software application event data, wherein software application event data comprises a data log from the software application;
   mapping the software application event data to the reliability model; and
   producing reliability and availability data based, at least in part, on the reliability model and on the software application event data.

2. The method of claim 1 wherein the reliability model comprises a finite-state machine having a plurality of states and a plurality of transitions between the states.

3. The method of claim 2 wherein mapping comprises:
selecting an entry of the event data; and
matching the entry to one of the transitions of the finite-state machine.

4. The method of claim 2 wherein the reliability model further comprises at least one event associated with at least one of the transitions.

5. The method of claim 4, wherein mapping comprises:
selecting an entry of the event data; and
matching the selected entry to one of the events associated with at least one of the transitions.

6. The method of claim 1 wherein the reliability and availability data comprise:
an application state;
a time when the application state was entered; and
a time when the application state was exited.

7. The method of claim 6 wherein the reliability and availability data further comprise:
an event associated with the application state; and
a time when the event occurred.

8. A computer-readable medium containing instructions for performing a method for producing software reliability and availability data, the method comprising:
accepting a reliability model, the reliability model having at least a first state and a second state and a plurality of transitions between the states;
accepting a collection manager, the collection manager allowing:
a selection of one or more computers from which to collect software application event data;
a selection of a group of computers which may be in separate locations on separate networks to create a virtual group of computers from which to collect software application event data; and
a selection of dates and times for the collection manager to operate;
accepting the software application event data, wherein software application event data comprises a data log from the software application;
mapping the software application event data to the reliability model; and
producing reliability and availability data based, at least in part, on the reliability model and on the software application event data.

9. A system for analyzing software reliability and availability, the system comprising:
a reliability model, the reliability model having at least a first state and a second state and a plurality of transitions between the states;
a collection manager, the collection manager allowing:
a selection of one or more computers from which to collect software application event data;
a selection of a group of computers which may be in separate locations on separate networks to create a virtual group of computers from which to collect software application event data; and
a selection of dates and times for the collection manager to operate;
the software application event data, wherein software application event data comprises a data log from the software application;
an analysis engine; and
software application reliability and availability data produced by the analysis engine based, at least in part, on the input of the software application event data and the reliability model.

10. A computer-readable medium containing instructions and data for a system for analyzing software reliability and availability, the system comprising:
a reliability model, the reliability model having at least a first state and a second state and a plurality of transitions between the states;
a collection manager, the collection manager allowing:
a selection of one or more computers from which to collect software application event data;
a selection of a group of computers which may be in separate locations on separate networks to create a virtual group of computers from which to collect software application event data; and
a selection of dates and times for the collection manager to operate;
the software application event data, wherein software application event data comprises a data log from the software application;
an analysis engine; and
software application reliability and availability data produced by the analysis engine based, at least in part, on the input of the software application event data and the reliability model.

11. The computer-readable medium of claim 10, wherein the application reliability and availability data is stored in a sojourn data structure, the sojourn data structure comprising:
a first data field containing data representing an application state;
a second data field containing data representing a time when the application state was entered; and
a third data field containing data representing a time when the application state was exited.

12. The computer-readable medium of claim 11, wherein the sojourn data structure further comprises:
a fourth data field containing data representing an event, the event comprising at least one of a transition out of the application state or a transition into the application state; and
a fifth data field containing data representing a time when the event occurred.

* * * * *